United States Patent [19]

Messenger

[11] Patent Number: 4,774,715
[45] Date of Patent: Sep. 27, 1988

[54] DEVICE FOR DEMODULATING A SPREAD SPECTRUM SIGNAL

[75] Inventor: Steven Messenger, Scarborough, Canada

[73] Assignee: Telesystems SLW Inc., Don Mills, Canada

[21] Appl. No.: 24,567

[22] Filed: Mar. 11, 1987

[51] Int. Cl.[4] .............................................. H04K 1/00
[52] U.S. Cl. ....................................................... 375/1
[58] Field of Search ............... 375/1; 371/28; 364/821

[56] References Cited

U.S. PATENT DOCUMENTS

| | | | |
|---|---|---|---|
| 4,125,764 | 11/1978 | Chambers et al. | 371/28 |
| 4,214,209 | 7/1980 | Baier | 375/1 |
| 4,387,465 | 6/1983 | Becker | 375/1 |
| 4,475,215 | 10/1984 | Gutleber | 375/1 |
| 4,675,839 | 6/1987 | Kerr | 364/821 |

Primary Examiner—Salvatore Cangialosi

[57] ABSTRACT

Circuitry for receiving and demodulating a spread spectrum signal integrates signal acquisition and tracking functions and also accommodates signal drift. Two data decoding signals are generated which correspond to the pseudo noise code used to modulate the received signal and which are phase-shifted by a half-chip interval. Two correlators use the decoding signals to demodulate the received signal, both during acquisition and tracking, producing two data signals. A summer combines the two data signals to produce a signal whose strength is less dependent on the degree of synchronization of each data decoding signal with the received signal. Tracking error circuitry periodically compares the two demodulated data signals and incrementally phase shifts the two data decoding signals, the magnitude of the increment being one-quarter chip and the polarity being selected to strengthen the weaker of the two data signals. This causes the circuitry to track the received signal despite gradual signal drift. A bank of correlators also demodulate the received signal using test decoding signals having different phase angles. The phase angles of the test decoding signals are periodically adjusted to locate stronger signals. Control circuitry constantly compares the strength of the demodulated test signals and of the two data signals and adjusts the phase of the two data decoding signals to correspond to that phase producing the strongest demodulated signal.

14 Claims, 5 Drawing Sheets

DEVICE FOR DEMODULATING A SPREAD SPECTRUM SIGNAL

FIELD OF THE INVENTION

The invention relates to devices and methods for decoding spread spectrum signals, and more particularly, to matters of synchronizing decoding signals generated by a receiver with a received spread spectrum signal.

DESCRIPTION OF THE PRIOR ART

Techniques for direct sequence, spread spectrum modulating and demodulating data signals are well known. Modulation involves generating a periodic, comparatively high-frequency, repetitive pseudo noise code (PN code) and effectively mixing the data signal with the PN code as with an exclusive OR gate or a balanced mixer. The resulting signal is characterized by very wide bandwidth and very low spectral energy density. To decode or demodulate a received spread spectrum signal, it is necessary to generate a decoding signal corresponding to the particular PN code previously used for encoding purposes and to apply both the received signal and the PN code to a balanced mixer or other means commonly referred to as a "correlator".

Spread spectrum modulation and demodulation might be particularly useful for transmission of data signals such as analog voice signals or digitized data in building interiors over radio frequency carriers. The low spectral density characteristic of such signal reduces the tendency for interference with other radio sensitive equipment. Also, spread spectrum techniques are known intrinsically to reduce interference between multiply reflected versions of a transmitted signal, as minimal phase differences between the local PN decoding signal and reflected signals results in low signal correlation and consequently minimal demodulation of such multiple signals.

The advantages associated with spread spectrum techniques also create problems regarding acquisition and tracking of a desired signal. Basically, it is difficult to synchronize a locally generated PN decoding signal with a received signal as no significant indication of the degree of non-synchronization between such signals is available until the phase difference between the signals is minimal. The ability to reject multiple reflections of a signal consequently creates difficulties in synchronizing to a desired signal. These features of spread spectrum techniques also create problems regarding continued tracking of a received signal. In particular, mismatch between the oscillators or clock signal generators required to produce PN code signals in the transmitting and receiving units tends to cause an apparent drift of the received signal relative to the receivers PN decoding signals. To ensure proper decoding, there is preferably no more than a one-half chip phase difference between the received signal and the local PN decoding signal. Even a gradual drifting of the received signal can cause a total loss of synchronization.

In the prior art, both digital and analog techniques have been developed to synchronize a local PN decoding signal to a transmitted spread spectrum signal. These techniques have effectively involved two distinct processes: initial acquisition of the transmitted signal, that is, a process of adjusting the phase angle of a local PN decoding signal to match that of the received signal; and tracking, that is, demodulating the received signal using the phase angle selected during the acquisition process.

During acquisition, the phase angle of the PN decoding signal might be shifted in one-half chip intervals through the full range of possible phase angles to obtain the phase angle which produces the strongest demodulated signal. This approach has serious shortcomings. In particular, tracking and decoding of a received signal is delayed until the assessment of all useful phase angles is complete. In the context of transmissions in the interior of an office building, changes in or obstruction of transmission paths owing to movement of persons or equipment may frequently necessitate reinitiation of the acquisition process. Lack of an ability to quickly respond to such transmission path problems may be particularly critical if the transmissions occur in bursts as, for example, in the transmission of data packets containing digitized data. In such a context, the resulting transmission errors and reduction of transmission rates may be unacceptable.

BRIEF SUMMARY OF THE INVENTION

In one aspect, the invention provides a device for demodulating a received signal which has been direct sequence encoded with a predetermined pseudo noise code. The device includes means for generating a data decoding signal corresponding to the predetermined pseudo noise code, and means for spread spectrum demodulating the received signal using the data decoding signal. Means are also provided for generating a test decoding signal which also corresponds to the predetermined noise code, and means for spread spectrum demodulating the received signal using the test decoding signal to produce a test signal. Comparator means continually compare the strength of the test signal and the data signal, and phase adjustment means adjust the phase of the decoding signal to correspond to the phase of the test signal when it is determined that the strength of the test signal exceeds that of the data signal. Means are provided for continually changing the phase of the test decoding signal, effectively to search for alternative phase angles which are perhaps more appropriate for demodulation of the received signal.

For purposes of the invention, the data decoding signal may comprise a plurality of signals which result in a plurality of demodulated data signals. Similarly the test decoding signal may comprise a plurality of signals which result in a plurality of demodulated test signals. Such an arrangement is incorporated into the preferred embodiment described herein.

Such a device integrates the acquisition and tracking functions necessary to demodulate a spread spectrum signal. Faster acquisition times can be achieved as demodulation of a received signal can be commenced as soon as any correlation occurs between a received signal and a locally generated data decoding signal. The device then hunts continually for alternative phase angles which produces stronger demodulated signal without disrupting the tracking and demodulation of the received signal. Such a device can better accommodate the types of transmission path obstructions and changes which are apt to occur when data is transmitted over radio frequency carriers in the interior of an office building than prior devices. Basically, if a principal signal begins to fade, the device can potentially locate a signal received along an alternative transmission path and switch the demodulation process to decode that alternative signal without disrupting associated data processing. This ensures more efficient and reliable data transmission.

Other inventive features will be described below in connection with a preferred embodiment and will be more specifically identified in the appended claims.

DESCRIPTION OF THE DRAWINGS

The invention will be better understood with reference to drawings illustrating preferred embodiments in which.

DESCRIPTION OF PREFERRED EMBODIMENT

Figure 1:
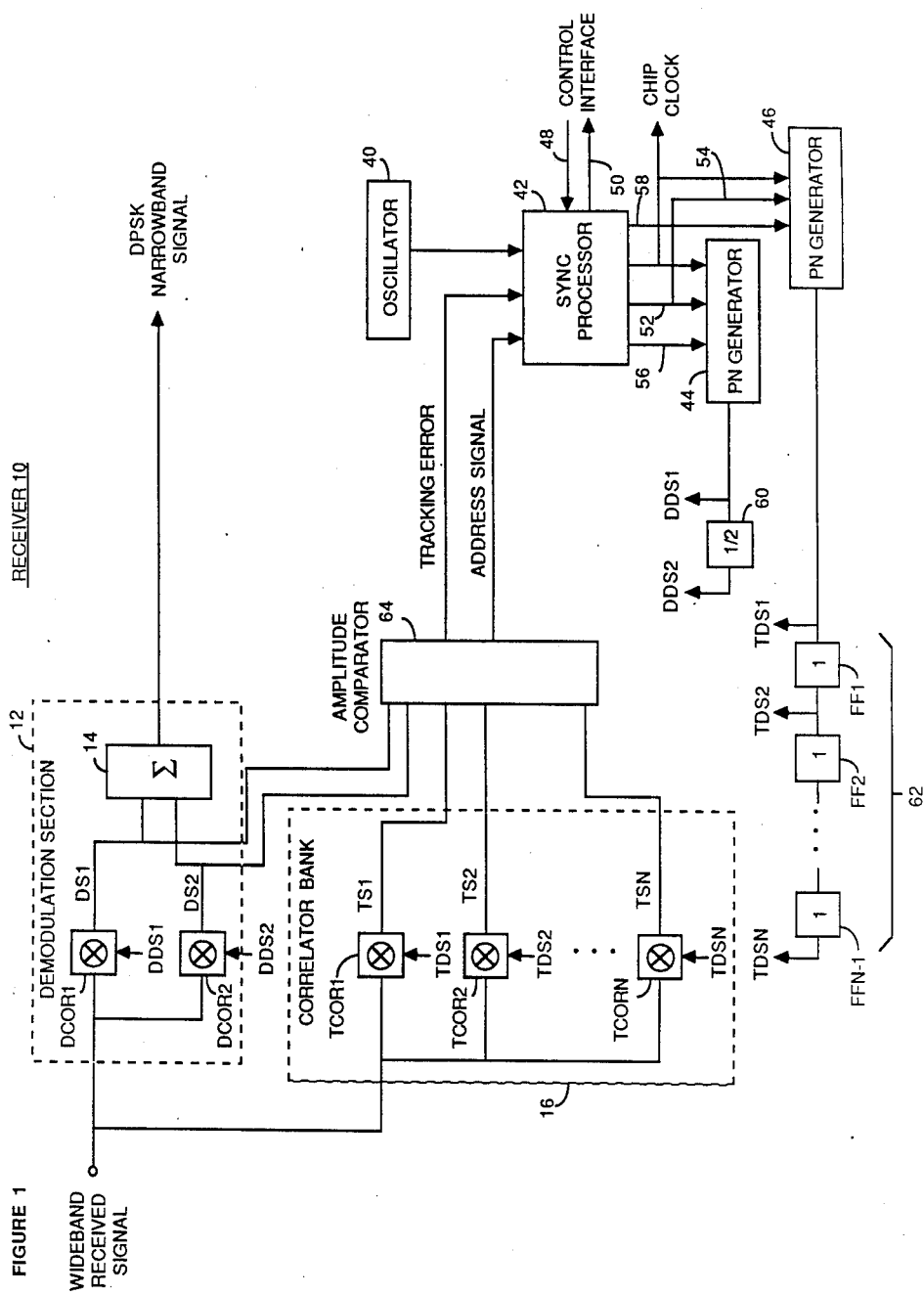
FIG. 1 diagrammatically illustrates a receiver adapted for direct sequence spread spectrum demodulation of received signals.

Reference is made to FIG. 1 which illustrates the overall configuration of a receiver 10 embodying the principles of the invention. A wideband signal spread spectrum encoded according to a predetermined PN code is received by the receiver 10 for demodulation. The received signal might comprise, for example, digitized data packets appropriately modulated according to a differential phase shift keying process (DPSK) and encoded onto an RF carrier in addition to being spread spectrum modulated. The present invention is concerned only with the manner in which such a wideband signal is to be spread spectrum demodulated to produce a narrow-band signal, the further decoding or processing required to convert such a signal into a digital data signal ultimately useful to digital data processing equipment being a matter which will be apparent to those skilled in the art.

The receiver 10 has a demodulation section 12 comprising two correlators DCOR1, DCOR2 and the received signal is applied to each of these correlators. In this embodiment of the invention, two PN data decoding signals DDS1, DDS2 are applied to the two correlators DCOR1, DCOR2 to spread spectrum demodulate the received signal thereby producing two data signals DS1, DS2. Both PN data decoding signals DDS1, DDS2 correspond to the predetermined PN code used initially to spread spectrum modulate the received signal prior to its transmission; that is, each consists essentially of the same pseudo random chip sequence characterising the predetermined PN code. The two PN data decoding signals DDS1, DDS2 are, however, phase-shifted relative to one another by the duration of one-half chip. What should be noted in that regard is that the phase difference between the two PN data decoding signals DDS1, DDS2 is sufficiently small that both PN decoding signals can be simultaneously synchronized to the received signal to an appreciable degree. This relationship between the two data decoding signals DDS1, DDS2 has considerable bearing on the manner in which the receiver 10 is adapted to track a drifting signal, a matter which will be discussed more fully below. The two data signals DS1, DS2 are combined by a summer 14 to produce a DPSK narrow band signal corresponding to the sum of the two data signals, which can then receive whatever further processing may be required.

Figure 4:
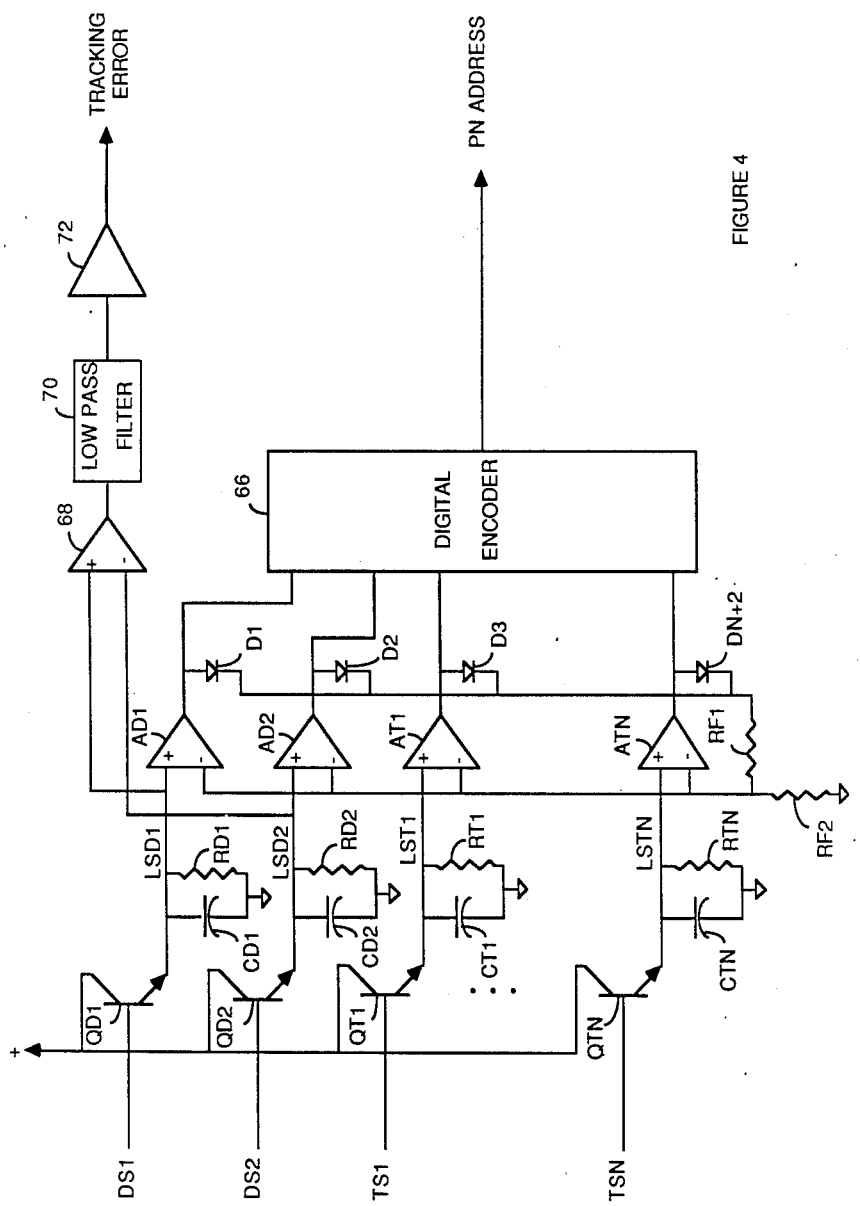
FIG. 4 diagrammatically illustrates comparator circuitry used by the receiver to compare demodulated signal strengths.

The receiver 10 also includes a bank 16 of correlators which are used essentially to test for alternative synchronization phase angles for the two PN data decoding signals DDS1, DDS2. In the correlator bank 16, there may be an arbitrary number of correlator which number is designated herein by the integer value "N". FIG. 4 has accordingly been fragmented to indicate N correlators designated TCOR1–TCORN. These correlators demodulate the received signal using N different PN test decoding signals designated TDS1–TDSN. Each of the test decoding signals TDS1–TDSN corresponds to the predetermined PN originally used to encode the received signal, but each has a different phase angle. Accordingly, these may be expected to produce demodulated "test" signals TS1–TSN of different strength.

Figure 2:
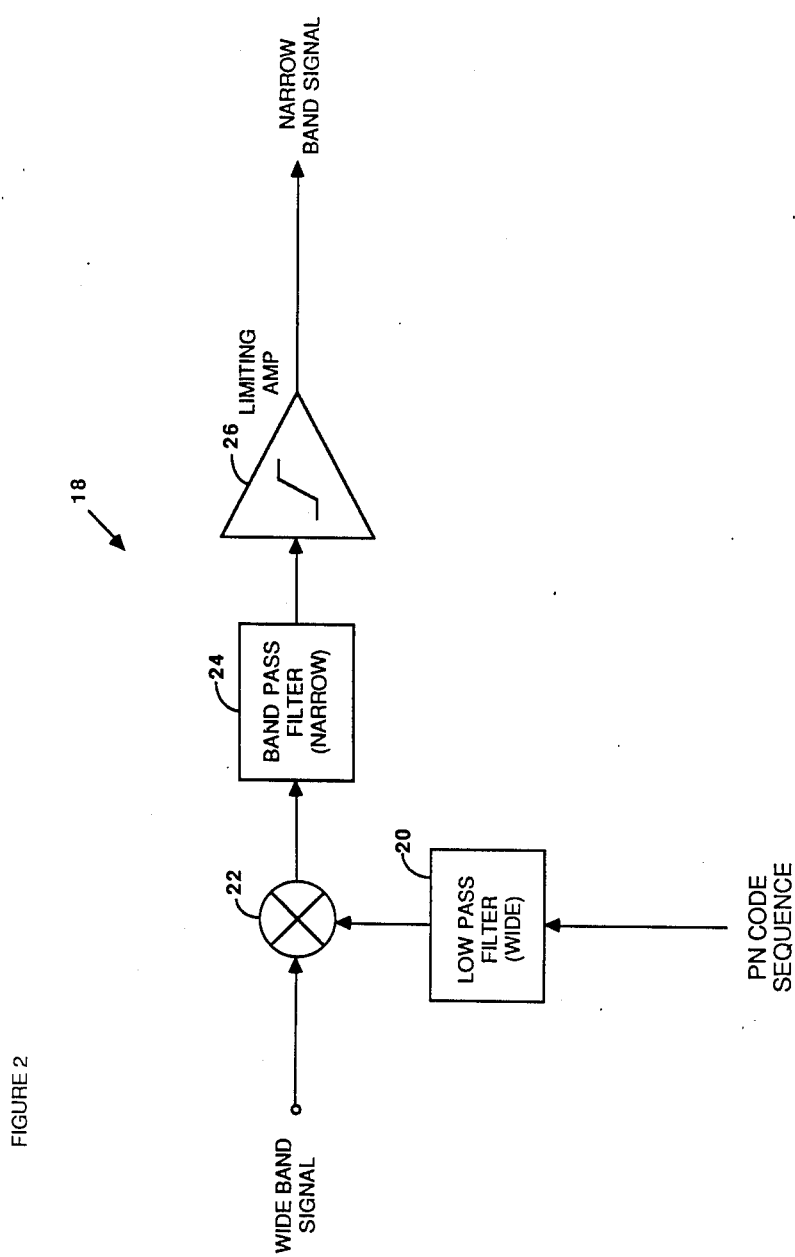
FIG. 2 diagrammatically illustrates a typical correlator associated with the receiver.

A typical correlator 18 which may be used in the demodulation section 12 and the correlator bank 16 is illustrated in FIG. 2. The correlator 18 includes a low pass filter 20 which removes unnecessary high frequency components of a locally-generated PN decoding signal (assumed of course to correspond to the encoding PN signal used to spread spectrum modulate the received signal). A balanced mixer 22 combines the wideband received signal with the filtered PN decoding signal thereby spread spectrum demodulating the received signal. If the received signal and the PN decoding signal are substantially synchronized, having a phase difference of less than 1 chip duration, the received signal is effectively collapsed into a narrowband signal of higher spectral energy density. Such a collapsed signal can then passed by a bandpass filter 24 tuned to the expected frequency range of the collapsed signal, eliminating wideband noise and any multiply reflected signals of different phase. The filtered signal is received by a limiting amplifier 26 to increase the strength of the demodulated signal for subsequent processing (such as RF demodulation and DPSK decoding).

Figure 3:
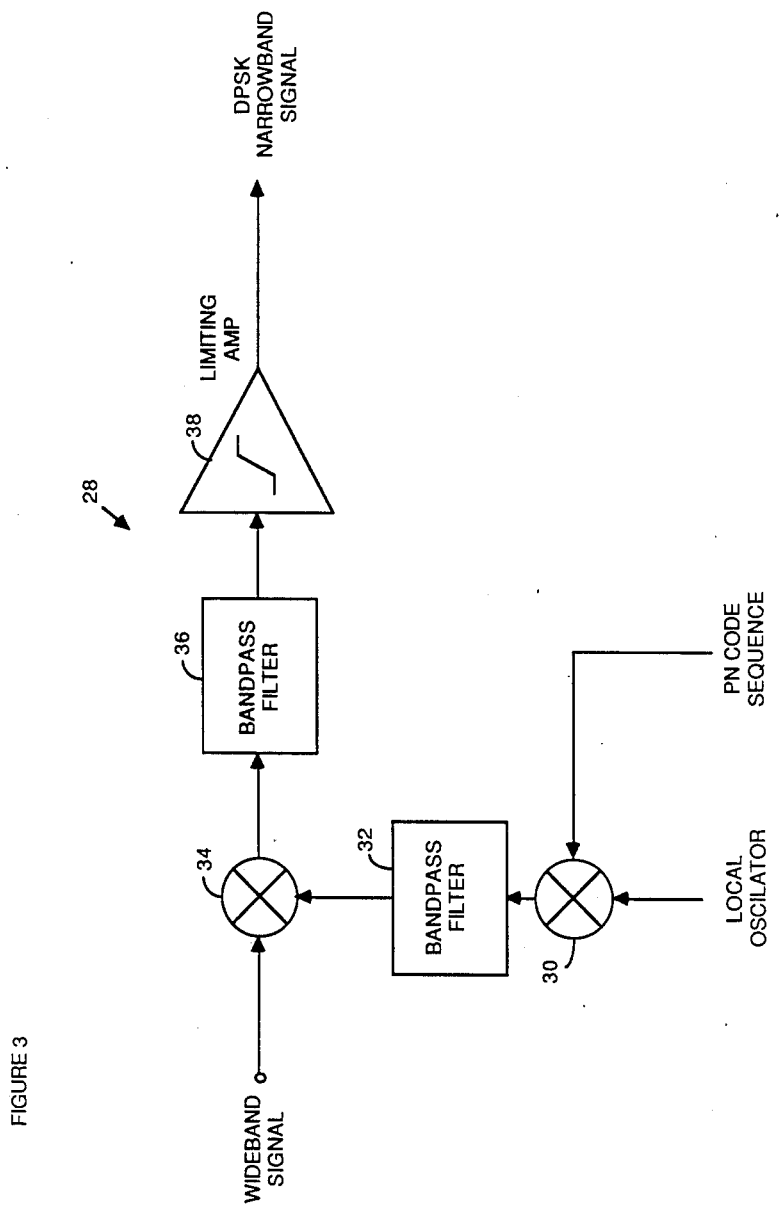
FIG. 3 diagrammatically illustrates an alternative correlator which may be incorporated into the receiver.

FIG. 3 illustrates an alternative embodiment of a correlator 28 which may be used in the demodulation section 12 and the correlator bank 16, a heterodyne correlator. In this correlator, a PN decoding signal is first modulated to radio frequencies by a balanced mixer 30 which use for such purposes an oscillatory RF signal (generated by a conventional source which has not been illustrated). The resulting RF signal is then bandpass filtered by a filter 32 to remove extraneous spectral content and applied to a balanced mixer 34 for combining with the wide band signal. The resulting spread spectrum demodulated signal is then applied to a bandpass filter 36 having a pass band appropriate for the expected demodulated signal and for filtering of wideband noise. The filtered signal is then processed by a limiting amplifier 38 to produce a DPSK narrow band signal.

Certain components of the receiver 10 serve to generate local decoding signals intended both for phase angle testing and for general data decoding. To that end, a local oscillator 40 generates a clock signal nominally of the same frequency as one associated with the transmitting unit (not illustrated) and used to generate the received signal. The frequency of the local oscillator 40 ultimately determines the frequency at which the chips of the basic decoding signals are generated. This clock signal is received by a synchronization processor 42 (a digital state machine) which regulates the generation of the PN decoding signals. The synchronization processor 42 controls a first PN code generator 44 to produce a first basic PN decoding signal for use in connection with the correlators DCOR1, DCOR2 of the demodulation section 12. It also controls a second PN code generator 46 which produces a second basic PN decoding signal for use in connection with the correlators TCOR-1-TCORN of the correlator bank 16.

The synchronization processor 42 is also adapted to control the general nature of the basic PN decoding signals and to control their phase. In response to signals received from appropriate external control circuitry along control interface lines 48, 50, the synchronization processor 42 applies signals along lines 52, 54 to the two PN code generators to cause them to generate a particular PN code. Such an arrangement is not essential to the invention, but permits added flexibility, allowing an operator at the external controls to select a basic PN decoding signal corresponding to one of a range of encoding signals used in such transmitters (not illustrated) as may be intended to convey data to the receiver 10. The synchronization processor 42 also controls the first and second PN code generators by transmitting signals along lines 56, 58 to adjust the phase angle of the two basic signals relative to the received signal.

The basic data decoding signal generated by the first PN code generator 44 is applied directly to the correlator DCOR1 of the demodulation section 12 and is in fact the data decoding signal previously designated DDS1. The basic decoding signal DDS1 is also phase-shifted by a one-half chip delay 60 to produce the second PN data decoding signal DDS2 that is applied to the other correlator DCOR2 of the demodulation section 12.

The basic test decoding signal designated TDS1 produced by the second generator 46 is applied to a shift register 62 (fragmented) comprising a total of N-1 flip-flops designated FF1 to FFN-1. Each flip-flop is adapted to produce a one-chip delay and together they in effect produces the test decoding signals TDS2-TDSN by successively phase-shifting the basic test decoding signal TDS1 by one-chip amounts. Each test decoding signal is then applied to a different one of the correlators TCOR1-TCORN in the correlator bank 16 for purposes of demodulating the received signal and producing the test signals TS1-TSN corresponding to different phase angle which might be considered for use in the demodulation section 12.

An amplitude comparator 64 serves to determine which of the test signals TS1-TSN and data signals DS1, DS2 resulting from demodulation of the received signal is strongest. The amplitude comparator 64 is illustrated in greater detail in the view of FIG. 4 where it may be seen to comprise a multiplicity of transistors. Two of these transistors QD1, QD2 serve to charge capacitors CD1, CD2 in response to the data signals DS1, DS2. Resistors RD1, RD2 in parallel with the capacitors CD1, CD2 cause controlled discharge of the capacitors CD1, CD2 thereby permit the voltages developed in the capacitors to follow general decreases in the voltage levels of the data signals DS1, DS2. Basically, each set consisting of a transistor, capacitor and resistor functions as a level detector, specifically a conventional peak detector, generating in response to the data signals DS1 and DS2 corresponding level signals LSD1 and LSD2. Transistors TT1-TTN, capacitors CT1-CTN and resistors RT1-RTN are similarly configured and serve as level detectors converting the test signals TS1-TSN into corresponding level signals LST1-LSTN.

The amplitude comparator 64 includes a plurality of differential amplifiers which receive the various level signals. Two of these amplifiers have been designated AD1 and AD2 and receive at their non-inverting terminals the level signals LSD1 and LSD2 associated with two data signals DS1, DS2 generated by the demodulation section 12. Another N differential amplifiers have been designated AT1-ATN and receive at their non-inverting terminals the level signals LST1-LSTN associated with test signals TS1-TSN generated by the correlator bank 16. The inverting terminals of the differential amplifiers AD1-AD2 and AT1-ATN are connected together and feedback between the output terminals of these amplifiers and the connected inverting terminals is provided in part by N+2 diodes D1 to DN+2, each diode connecting a different amplifier output terminal to feedback resistors RF1 and RF2. This arrangement places the inverting terminals of the amplifiers AD1-AD2 and AT1-ATN at a voltage corresponding to the level signal of greatest magnitude. Accordingly, all output terminals will tend to be at the negative supply voltage except for the one output terminal corresponding to the level signal of greatest strength.

The output terminals of the various amplifiers AD1, AD2 and AT1-ATN are connected to a digital encoder 66 which can conveniently generate from the polarity of the output signals an address signal uniquely identifying the strongest signal. The address signal is received by the synchronization processor 42 which responds by adjusting the phase of the basic data decoding signal DDS1 generated by the first PN code generator 44 to correspond to the phase of the one of the test decoding signals TDS1-TDSN corresponding to the strongest of the demodulated test signals TS1-TSN, if the strongest of test signals TS1-TSN is in fact stronger than either of the two data signals DS1, DS2 produced by the correlators DCOR1, DCOR2 of the demodulation section 12.

Means are also provided for correcting tracking errors arising, for example, from a mismatch in the clock frequency used to encode the received signal and the clock frequency of the local oscillator 40. To that end, the amplitude comparator 64 illustrated in FIG. 4 includes a low gain differential amplifier 68 which receives at its inverting and non-inverting terminals the level signals LSD1 and LSD2 corresponding to the two demodulated data signals DS1, DS2. The resulting amplified difference signal is processed by a low pass filter 70 to remove high frequency components which might affect comparison of the difference signal to a DC reference value. The filtered signal is then received by a comparator 72 which responds to the polarity of the difference signal, producing a tracking error signal indicating which of the data signals DS1, DS2 has the greatest strength. The comparator 72 may simply take the form of an operational amplifier operated with little or no feedback, whose non-inverting terminal receives the difference signal and whose inverting terminal is coupled to a ground reference.

The synchronization processor 42 receives the tracking error signal and adjusts the phase of the basic data decoding signal DDS1 generated by the first signal generator 44, but only incrementally. Essentially, the phase of the basic data decoding signal DDS1 is adjusted by an amount corresponding to the duration of a one-quarter chip, the polarity of the increment being selected so that the weaker of the two data signals DS1, DS2 is strengthened, basically synchronizing the decoding operation of the correlator associated with the weaker of the two data signals DS1, DS2 more closely with the received signal.

Figure 5A:
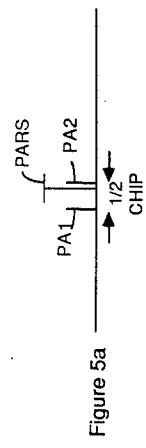
FIGS. 5a–5c diagrammatically indicate how drifting of a received signal is accommodated by the receiver; and, FIGS. 6a–6c diagrammatically indicate how the phase of a plurality of test decoding can be varied to search for decoding signal phase angles more conducive to proper decoding of a received signal.
Figure 5B:
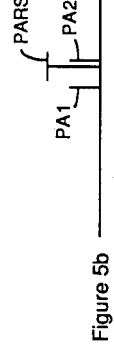
Figure 5C:
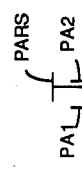

The manner in which the tracking error correction means accommodate apparent drifting of the received signal is symbolically illustrated in a very simplified fashion in FIGS. 5a-5c. In FIGS. 5a-5c the phase angles of the first and second data decoding signals DDS1, DDS2 applied to the demodulation section 12 have been indicated respectively as vertical lines PA1 and PA2. The phase angle of the received signal has been indicated by a T-shape labelled PARS. These are indicators of relative phase only.

Reviewing FIGS. 5a-5c in succession it will be apparent that the received signal is subject to drift, its relative phase angle PARS changing continually. In FIG. 5a it has been arbitrarily assumed that the first data decoding signal DDS1 is more closely synchronized with the received signal (having a smaller phase difference relative to the received signal) and accordingly the corresponding data signal DS1 generated by demodulation is stronger. The tracking error signal would in such circumstances indicate that the second data signal DS2 corresponding to phase angle PA2 is weaker, and the synchronization processor 42 would then shift the phase angles PA1 and PA2 by one-quarter chip to tend to reduce the phase difference between the second data decoding signal DDS2 and the received signal thereby tending to increase the strength of the second data signal DS2. However, as shown in FIG. 5b, the received signal has drifted further, this drifting tending once again to increase the phase separation between the second data decoding signal DDS2 and the received signal. The synchronization processor 42 once again responds by effectively incrementing the phase angles PA1 and PA2 by a quarter-chip to attempt to better synchronize the second data decoding signal DDS2 with the received signal. This arrangement effectively causes the data decoding signals DDS1, DDS2 to track the received signal.

The principles of operation inherent in the tracking error means can accommodate any conditions producing a gradual drift of the received signal. The summer 14 is important in such an arrangement, as it cannot be guaranteed at any given time which of the decoding signals DDS1, DDS2 will be more closely synchronized with the received signal and which of the demodulated data signals DS1, DS2 would have a signal strength more appropriate for further processing. Summing the two data signals DS1, DS2 ensures that a signal of reasonable strength is always provided. The summing of the two signals DS1, DS2 has another significant aspect: if either of the two demodulated data signals DS1, DS2 were relied upon exclusively for subsequent data retrieval, its amplitude would appear significantly modulated by the incremental phase shifting implemented by the tracking error means, successively increasing and decreasing. The combined data signal produced by the summer 14 tends to display a more constant amplitude.

The frequency at which the synchronization processor 42 incrementally adjusts phase angles of the two data decoding signals DDS1, DDS2 is selected according to the manufacturer's specified tolerances in the frequency of operation of the local oscillator 40 and the corresponding oscillator (not illustrated) in the transmitting unit (not illustrated) which transmits the received signal. It will be readily apparent to those skilled in the art how such information can be used to calculate the maximum expected rate of drift of the received signal. The synchronization process might typically be timed to perform its incremental adjustment of phase angles once in every 1000 cycles of the local oscillator 40, a triggering signal for such adjustment being generated and timed by dividing the local oscillator's signal in a conventional manner. Although the phase angles might be adjusted more frequently, it is desirable even with use of the summer 14 to avoid unnecessary amplitude modulation of the combination of the two data data signals DS1, DS2.

Figure 6A:
Figure 6B:
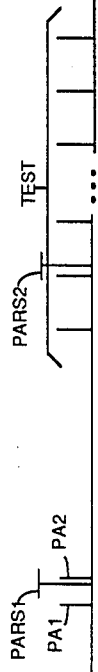
Figure 6C:
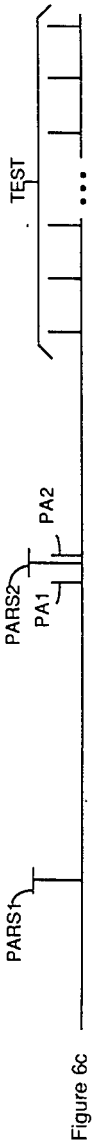

FIGS. 6a-6c indicate in a symbolic manner how the receiver 10 continually hunts for decoding signal phase angles which can produce stronger demodulated data signals and continually adjusts the phase angles of the data decoding signals DS1 and DS2, the latter phase again once again being designated PA1 and PA2. The phase angles associated with the test decoding signals TDS1-TDSN having been illustrated as a set vertical of lines collectively labelled with the word 37 TEST", there being N such lines in total, but the drawing being fragmented in the regard and showing only six. Two relative phase angles of two received signal have been indicated by T-shapes and labelled PARS1 and PARS2, these representing, for example, the received signal transmitted along different transmission paths due to multiple reflections and resulting phase differences. The relative horizontal spacing of the vertical lines and the T-shapes is intended to indicate relative phase differences.

For the initial phase settings of the test decoding signals in FIG. 6a, one of the test decoding signals arbitrarily assumed to be TDS3 may be seen to be more closely synchronized with the received signal having phase angle PARS1 and would consequently produce a comparatively strong demodulated test signal. If the receiver 10 were just initiating decoding of the received signal, the phase of the data decoding signals DDS1, DDS2 might be set to correspond the phase of the test decoding signal TDS3 as indicated in FIG. 6b.

The synchronization processor 42 then shifts the phases of each test decoding signals by an increment corresponding to N+1 chip durations as in FIG. 6b. The test decoding signal TDS2 might then be substantially synchronized with the received signal having the phase angle PARS2. If the associated demodulated test signal is the strongest of the other test signals TS1-TSN and also the two demodulated data signals DS1, DS2, the synchronization processor 42 would adjust the phase of the two data decoding signals DDS1, DDS2 used by the demodulation section 12 to correspond to the phase angle of the test signal TS2, as illustrated in FIG. 6c. Otherwise their phase angles would remain unchanged.

In FIG. 6c, the synchronization processor 42 has once again shifted the phase angle of each of the test decoding signals TDS1-TDSN by N+1 chip durations.

With the new phase angle settings, no version of the received signal is detected, and accordingly the phase angles of the two data decoding signals DDS1, DDS2 are not adjusted by the synchronization processor 42. Assuming that all possible phase angles (at one chip intervals) have been exhausted, the synchronization processor 42 might once again restore the phase angles of the test decoding signals to correspond to those illustrated in FIG. 6a. This process would be repeated periodically to continuously scan for stronger versions of the received signal. The manner in which the receiver 10 scans for better phase relationships with the received signal is not a critical aspect of the invention: alternative phase angles may be checked in any manner which canvasses a wide range of possible angles.

The integrated acquisition and tracking system of the receiver 10 can significantly reduce acquisition time, as useful data decoding begins as soon as a useful received signal is detected. Also, use of a parallel arrangement of correlators to locate alternative phase relationships further reduces signal acquisition time. This is critical in the context of spread spectrum data packet transmission where a very finite amount of data is transmitted and quick synchronization to a given data packet is required if high data transfer rates are to be achieved. Also, since the receiver 10 continually scans for stronger signals to decode, it can accommodate the fading of a signal transmitted along a particular signal path, causing the demodulation section 12 to lock onto a stronger signal transmitted along a different signal path without disrupting the decoding process and subsequent data processing. In the context of data transmission in packet form in the interior of an office building, where multiple transmission paths may be expected and where signal obstructions and changes in transmission paths can be expected to occur quite frequently, the receiver 10 can in many instances lock onto a different signal for data decoding before a given signal is entirely lost, thereby reducing data transmission errors and increasing data throughput.

It will be appreciated that a particular embodiment of the invention has been described, and that modifications may be made therein without departing from the spirit of the invention or the scope of the appended claims. In particular, although the advantages of the spread spectrum demodulation techniques taught herein have been described largely in connection with spread spectrum modulation of digitized data packets, the techniques also have application to transmission of analog signals.

I claim:

1. A device for demodulating a spread spectrum signal which has been direct sequence encoded with a predetermined pseudo noise code, comprising:
   means for generating a data decoding signal corresponding to the predetermined pseudo noise code;
   means for spread spectrum demodulating the spread spectrum signal with the data decoding signal to produce a data signal;
   means for generating a test decoding signal corresponding to the predetermined pseudo noise code;
   means for spread spectrum demodulating the spread spectrum signal using the test decoding signal to produce a test signal;
   comparator means for comparing the strength of the test signal with the strength of the data signal;
   means responsive to the comparator means for adjusting the phase of the data decoding signal relative to the spread spectrum signal to correspond to the phase of the test signal whenever the strength of the test signal exceeds the strength of the data signal; and,
   means for continually adjusting the phase of the test decoding signal in a predetermined manner such that alternative phase relationships resulting in a synchronization between the test decoding signal and the spread spectrum signal can be produced.

2. A device for demodulating a spread spectrum signal which has been direct sequence encoded with a predetermined pseudo noise code, comprising:
   decoding signal generating means for generating a first data decoding signal corresponding to the predetermined pseudo noise code;
   data demodulation means for demodulating the spread spectrum signal with the first data decoding signal to produce a first data signal;
   test signal generating means for generating a plurality of test decoding signals corresponding to the predetermined pseudo noise code, each of the test decoding signals being phase-shifted relative to any other of the test decoding signals by a predetermined amount;
   test demodulation means for spread spectrum demodulating the spread spectrum signal using the test decoding signals to produce a plurality of test signal, each test signal corresponding to the demodulation of the spread spectrum signal with a different one of the test signals;
   comparator means for comparing the strength of the test signals and the first data signal;
   decoding signal phase adjusting means responsive to the comparator means for adjusting the phase of the first data decoding signal relative to the spread spectrum signal to correspond to the phase of the test decoding signal corresponding to the strongest of the test signals whenever the strength of the strongest of the test signals exceeds the strength of the first data signal; and,
   test decoding signal phase adjusting means for continually adjusting the phase of the test decoding signals relative to the spread spectrum signal in a predetermined manner such that alternative phase relationships resulting in a synchronization between the test decoding signals and the spread spectrum signal can be produced.

3. A device as claimed in claim 2 in which:
   the decoding signal generating means comprise means for generating a second data decoding signal corresponding to the predetermined pseudo noise code, the second data decoding signal being phase-shifted relative to the first data decoding signal by an amount so selected that the second data decoding signal tends to be synchronized relative to the spread spectrum whenever the first data decoding signal is synchronized with the spread spectrum signal;
   the data demodulation means comprise means for demodulating the spread spectrum signal with the second data decoding signal to produce a second data signal; and,
   the comparator means are adapted to compare the strength of the second data signal with the strength of the first data signal and the test signals; and,
   the decoding signal phase adjusting means are adapted to adjust the phase of the first and second data decoding signals relative to the spread spectrum signal to correspond to the phase of the test decoding signal corresponding to the strongest of the test signals whenever the strength of the strongest of the test signals exceeds the strength of the first and second data signals.

4. A device as claimed in claim 3 comprising summing means for producing a signal corresponding to the sum of the first and second data signals.

5. A device as claimed in claim 4 in which the comparator means comprise:
data signal comparison means for comparing the strength of the first and second data signals;
incremental phase adjustment means for adjusting each of the phase angles of the first and second data decoding signals by an incremental amount, the polarity of the incremental amount being selected such that the weaker of the first and second data signals tends to increase in strength.

6. A device as claimed in claim 1 in which the comparator means comprise:
a plurality of signal level detectors, each signal level detector receiving a different one of the test signals and the first data signal and producing a level signal corresponding to the magnitude of the received one of the test signals and the first data signal;
a plurality of amplifiers, each amplifier having an inverting terminal, a non-inverting terminal and an output terminal, the inverting terminals being connected together and each non-inverting terminals being coupled to a different one of the peak detectors to receive a different one of the level signals; and,
feedback means for coupling the output terminals of the amplifiers to the connected inverting terminals such that a signal corresponding to the one of the level signals having the largest magnitude is generated at each of the inverting terminals;
whereby, the output terminals of each of the amplifiers has voltage with a particular polarity except the output terminal of the amplifier receiving the one of the level signals having the largest magnitude.

7. A device for demodulating a spread spectrum signal which has been direct sequence encoded with a predetermined pseudo noise code, comprising:
decoding signal generating means for a plurality of data decoding signals, each data decoding signal corresponding to the predetermined pseudo noise code, each of the data decoding signals being phase-shifted relative to any other of the data decoding signals by a predetermined amount;
data demodulation means for demodulating the spread spectrum signal with the plurality of data decoding signals to produce a plurality of data signals, each data signal corresponding to the demodulation of the spread spectrum signal with a different one of the plurality of data decoding signals;
test signal generating means for generating a plurality of test decoding signals corresponding to the predetermined pseudo noise code, each of the test decoding signals being phase-shifted relative to any other of the test decoding signals by a predetermined amount;
test demodulation means for spread spectrum demodulating the spread spectrum signal using the test decoding signals to produce a plurality of test signal, each test signal corresponding to the demodulation of the spread spectrum signal with a different one of the test signals;
comparator means for comparing the strength of the test signals and the data signals;
decoding signal phase adjusting means responsive to the comparator means for adjusting the phase of the decoding signals relative to the spread spectrum signal to correspond to the phase of the test decoding signal corresponding to the strongest of the test signals whenever the strength of the test signals exceeds the strength of the data signal; and,
test decoding signal phase adjusting means for continually adjusting the phase of each test decoding signal relative to the spread spectrum signal in a predetermined manner such that alternative phase relationships resulting in a synchronization between the test decoding signals and the spread spectrum signal can be produced.

8. A device as claimed in claim 7 comprising summing means for producing a signal corresponding to the sum of the data signals.

9. A device as claimed in claim 8 in which the comparator means comprise:
data signal comparison means for comparing the strength of the data signals;
incremental phase adjustment means for adjusting each of the phase angles of the decoding signals by an incremental amount, the polarity of the incremental amount being selected such that the weakest of the plurality of data signals tends to increase in strength.

10. A device as claimed in claim 7 in which the comparator means comprise:
a plurality of level detectors, each level detector receiving a different one of the test signals and the data signals and producing a level signal corresponding to the magnitude of the received one of the test signals and the data signals;
a plurality of amplifiers, each amplifier having an inverting terminal, a non-inverting terminal and an output terminal, the inverting terminals being connected together and each non-inverting terminals being coupled to a different one of the level detectors to receive a different one of the level signals; and,
feedback means for coupling the output terminals of the amplifiers to the connected inverting terminals such that a signal corresponding to the one of the level signals having the largest magnitude is generated at each of the inverting terminals;
whereby, the output terminals of each of the amplifiers has voltage with a particular polarity except the output terminal of the amplifier receiving the one of the level signals having the largest magnitude.

11. A device as claimed in claim 7 in which the test signal generating means comprise:
means for generating a base signal corresponding to the predetermined pseudo noise code; and,
delay means for producing the test signals by successively delaying the base signal relative to the spread spectrum signal by a predetermined amount.

12. A device as claimed in claim 11 in which the test decoding signal phase adjusting means are adapted to adjust the phase of the base signal relative to the spread spectrum signal periodically by an amount such that the resulting phase angle of each of the test decoding signals is outside a range of phase angles limited by the least and the greatest of the current phase angles of the test decoding signals.

13. A device for demodulating a spread spectrum signal which has been direct sequence encoded with a predetermined pseudo noise code, comprising:

decoding signal generating means for generating a plurality of data decoding signal corresponding to the predetermined pseudo noise code, the data decoding signals being phase-shifted relative to the one another such that the data decoding signal can be simultaneously synchronized to the spread spectrum signal;

a plurality of each of demodulation means for spread spectrum demodulating the spread spectrum signal with a different one of the data decoding signals to produce a plurality of data signals;

combining means for producing a summation signal corresponding to the sum of the data decoding signals;

comparator means for comparing the strength of the data signals;

synchronization control means for adjusting the phase of the plurality of decoding signals relative to the spread spectrum signal so as to maintain a general synchronization between the decoding signals and the spread spectrum signal, the synchronization control means including means responsive to the comparator means and controlling the data signal generating means for incrementally adjusting the phase of the plurality of decoding signals relative to the spread spectrum signal such that the weakest of the data signals tends to be strengthened.

14. A device as claimed in claim 13 in which:

the data decoding signals are phase-shifted relative to one another by no more than about one-half of the duration of a chip of the data decoding signals; and, the means for incrementally adjusting the phase of the plurality of decoding signals is adapted to increment the phase of each of the data decoding signals by no more than about quarter of the duration of a chip of the data decoding signals.

* * * * *